United States Patent [19]

Wagner

[11] 4,109,805
[45] Aug. 29, 1978

[54] DEVICE FOR INSERTING AND/OR WITHDRAWING PARTICULARLY LONG AND/OR HEAVY MATERIAL IN A STORAGE CONTAINER

[75] Inventor: Hans Wagner, Esslingen, Fed. Rep. of Germany

[73] Assignee: Hans Fehr GmbH, Fed. Rep. of Germany

[21] Appl. No.: 748,163

[22] Filed: Dec. 7, 1976

[30] Foreign Application Priority Data

Dec. 11, 1975 [DE] Fed. Rep. of Germany ....... 2555712

[51] Int. Cl.² ............................................. B65G 1/06
[52] U.S. Cl. ................................. 214/16.4 A; 214/730
[58] Field of Search ................. 214/16.1 D, 16.1 DB, 214/16.4 R, 16.4 A, 95 R, 730, 16.4 C

[56] References Cited

U.S. PATENT DOCUMENTS

| 2,386,520 | 10/1945 | Watson et al. | 214/11 R |
| 2,980,038 | 4/1961 | Royer | 214/16.4 R |
| 3,337,070 | 8/1967 | Guilbert, Jr. | 214/95 R |
| 3,820,670 | 6/1974 | Pizzo et al. | 214/16.1 DB |

Primary Examiner—Lawrence J. Oresky
Attorney, Agent, or Firm—Watson, Cole, Grindle & Watson

[57] ABSTRACT

A device for inserting or withdrawing long or heavy objects into or from a storage container comprising a column structure movably positioned on rail tracks, a vertically positionable elevating table mounted on the column structure, at least one gripper support positioned on the elevating table, the gripper support movably supporting a gripper device which includes gripper arms which function to grip the objects for insertion or withdrawal from the storage container, the gripper device including a circulating chain and lever linkage connected at one end to the circulating chain and at the other end to the gripper arms, the circulating chain and lever linkage operating such that the opening and closing movement of the gripper arms is accomplished quickly and in a very accurate manner.

26 Claims, 8 Drawing Figures

DEVICE FOR INSERTING AND/OR WITHDRAWING PARTICULARLY LONG AND/OR HEAVY MATERIAL IN A STORAGE CONTAINER

BACKGROUND OF THE INVENTION

The present invention relates to a device for inserting and/or withdrawing particularly long and/or heavy materials in or from a storage container having preferably several horizontal and vertical rows, which device utilizes an elevating table positioned on a movable column structure, the elevating table having at least one gripper support which is equipped with at least one gripper device that is movable in its longitudinal direction for withdrawing material from the storage area and putting material into the storage area.

In known types of long-material stackers, the material to be put into or withdrawn from stock is generally stored in bins, each bin being kept in a storage area in a particular compartment identified by a horizontal row and a vertical row. It is necessary for such a bin to be made available and returned into the storage area as quickly as possible by means of such a long-material stacker. Such a bin is moved in and out by a gripper device which pulls the bin onto the gripper support and pushes it back into the storage area which is normally designed as a set of shelves. When the gripper device moves, it must be ensured that the bin can be picked up in its location in the storage area by gripper arms and held securely during the entire withdrawal movement. During the insertion movement into the storage area, the bin must again be held securely the whole time by the gripper arms, and above all it must be possible to position the bin very accurately in the storage area or in the set of shelves in order to ensure that the bins are always arranged in the same way relative to the front edge of the storage area and can be picked up with certainty during the next withdrawal operation. This means that the gripper device must always be able to pick up and release a bin in a defined position which is always the same.

In known devices of this kind, this has previously been achieved by the gripper device being controlled by limit switches on the gripper support, with the gripper arms themselves being controlled by suitably designed cam plates which have a fixed location. A disadvantage of this is that the limit switches reduce the working speed, that is, they operate with a loss of time, and thus the operation of the gripper device is delayed. If a limit switch fails, this can result in considerable damage to the entire device and/or to the storage shelves. Another disadvantage is due to the large size of construction which is necessary, because the gripper arms must interact with the cam plates through relatively large roller bearings on account of the high load which is in the region of about one ton. Because of this load on the gripper device when withdrawing or inserting the loaded bins, it is not possible to use a plain bearing or similar small-size element.

One object of the present invention is to produce a device of the type described at the outset in such a manner that the gripper device can be made considerably smaller and with which the material can be positioned more accurately especially when putting it into stock.

SUMMARY OF THE INVENTION

According to the present invention, this object is solved by the gripper device, which can be moved to-and-fro along the gripper support by means of a rotary chain or cable or the like, having at least two gripper arms whose movement for picking up or releasing the material is derived from the movement of the chain or the cable or the like in its range of rotary motion.

In the device designed according to the present invention, the accurate positioning of the material or of a bin loaded with the material is thus not dependent on limit switches and the like, and hence such positioning is always possible with consistent accuracy and is essentially trouble-free. Since the circulation of the chain is always positive, i.e., in the same direction, the gripper device is always operated at the same point or in the same range without it being necessary to accept substantial play or hysteresis behaviour or the like. Another advantage is that both the movement of the gripper arms and the movement of the gripper device along the gripper support, or the execution of all movements, is effected from a single drive. Thus, a second drive is no longer required and consequently additional circuits for the control and the like and their elements can be saved.

Depending on the manner in which the gripper arms pick up or release the material or a bin, it may be favorable for this movement to consist of a closing or opening movement respectively of the gripper arms and of a movement which brings the gripper arms out of the handling range of the material or bin. This is particularly advantageous if the opening and closing movement is a horizontal rectilinear sliding movement of the gripper arms in opposed directions, because then it may not be necessary to implement further measures in order to bring the gripper arms out of the handling range at the material or bin following their opening movement or before their closing movement. Very accurate positioning is thus obtained automatically and positively if the opening or closing movement of the gripper arms takes place practically instantaneously. This opening and closing movement of the gripper arms can be effected roughly in the region of preferably that "dead center" of the chain, cable or the like in which its horizontal velocity is zero or practically zero. This consistent and certain positioning is not affected by the weight of the material or of the bin, and a positioning accuracy of approximately $+/- 2$ mm (0.08 inch) can be obtained. This is extremely accurate. It is advantageous for each gripper support to have two gripper devices where the gripper arms of one point to one side and those of the other to the other side.

In the preferred embodiment of the present invention, the gripper arms are linked to the circulating chain, cable, or the like by a steering lever linkage. This makes it possible to reduce the large forces which occur on the gripper arms up to the point where the movement is transferred at the chain to such an extent that the forces can be better controlled and consequently the gripper device can be made smaller. It is expedient for the steering lever linkage to have a single-arm control lever which is firmly connected to the chain or the like through a pin which is immovably attached to it, the pin being advantageously guided in a mainly vertical slotted guide arranged on the horizontally movable gripper device. This allows the movement of the circulating chain or the like to be transferred in a simple manner.

Simple transfer of the rotary movement of the chain to the gripper arms such that the instantaneous oppositely directed opening or closing movement takes place in the region of the dead center of the chain, i.e., such that no opening movement of the gripper arms takes place in the initial region of the rotary motion of the chain, is obtained if the two gripper arms are suitably connected to the single-arm control lever through at least one elbow lever having preferably two arms. The elbow lever thus has a dead angle range in which there is no opening or closing movement of the gripper arms. The angular range of rotary motion of the chain or the like giving rise to this dead region with respect to the movement of the gripper arms is roughly in the range of 80° to 90°, preferably at about 95°.

In another preferred embodiment of the present invention, the gripper device is designed in two parts such that the guide plate with slotted guide is located in a fixed position with respect to the chain or the like and the gripper plate equipped with the gripper arms is located movably essentially in a perpendicular direction with respect to the plane of the chain or the like. In this way, it is possible to obtain a relatively large stroke of the gripper arms in a perpendicular direction relative to the plane of the chain, and this may be necessary in order to ensure lowering of the gripper arms away from the handling range of the material container or bin or alternatively to raise them up to this handling range. In order to obviate the need for additional complicated guides, the gripper plate is expediently held to the guide plate in such a manner that it can be moved vertically. The two plates may have shafts that are parallel to each other and connected by a control lever such that they can swivel. This control lever takes up both the weight of the gripper plate with the gripper arms and the tensile forces which occur when a material container is pulled out by the gripper arms. This lifting movement is derived from the chain or the like in a simple manner by the gripper plate which bears against one end of a two-arm control lever pivotably located on the guide plate, preferably with spring loading, the other end being located against a cam plate which is connected to the single-arm control lever attached to the chain or the like. One can thus determine by simple means in which angular range of rotary motion of the chain or the like a lifting movement is to be effected and with which speed this is to take place. Furthermore, it is possible to set the magnitude and/or speed of this lifting movement.

Further details and developments of the present invention will become apparent from the following description in which the present invention is described in more detail and explained with reference to the embodiment shown in the drawing. In the drawing.

DETAILED DESCRIPTION OF THE PREFERRED EMBODIMENTS

Figure 1:
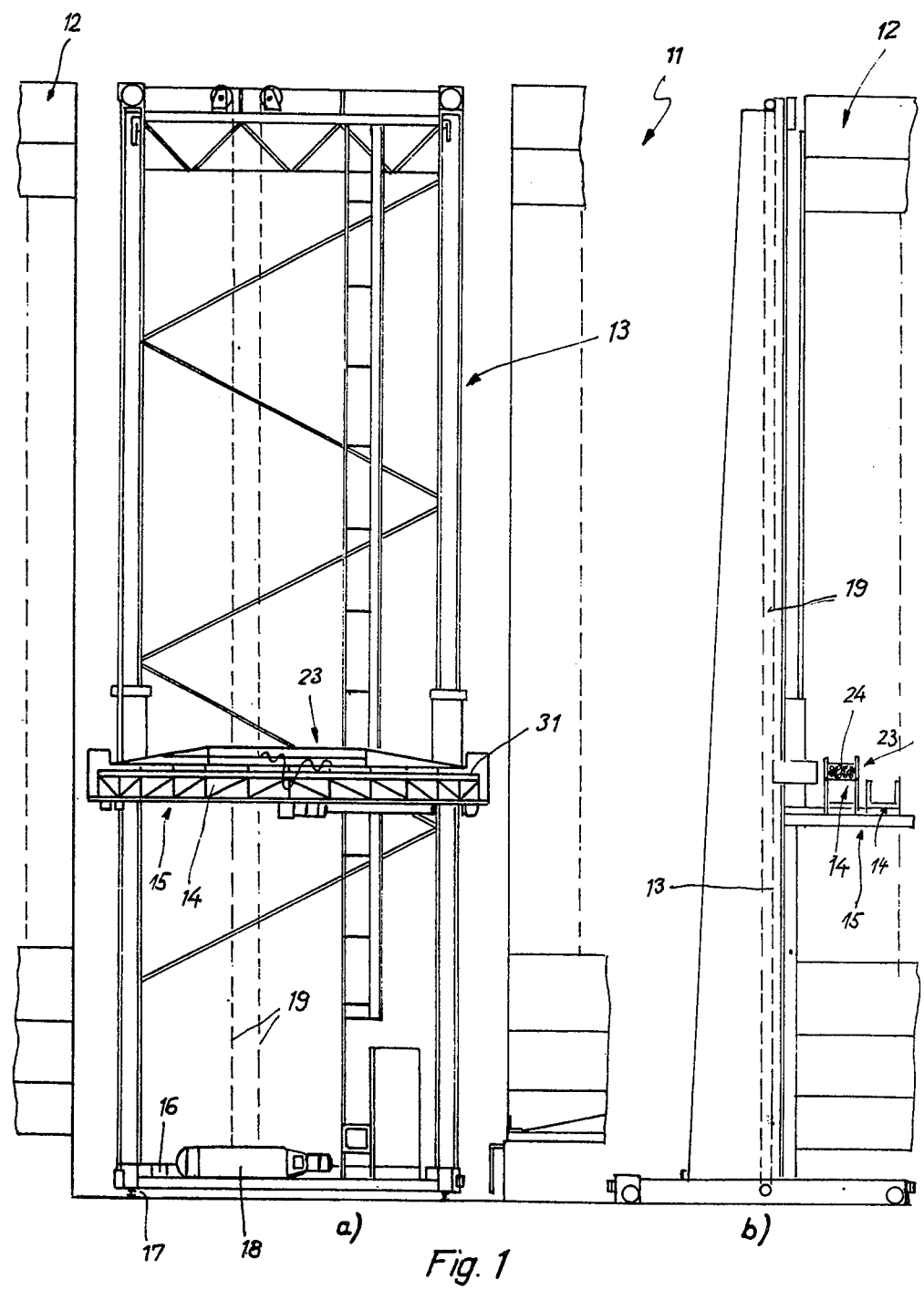
FIG. 1a and 1b show in schematic representation a front view and a side view, respectively, of a long-material stacker according to one embodiment of the present invention.

The device according to the present invention for inserting and/or withdrawing, for example, long and/or heavy material in a vertically arranged storage container or the like is shown schematically in FIG. 1 in the form of a long-material stacker. On one or both sides of the device 11 there is a set of storage shelves 12 along the horizontal rows of which a column structure 13 and along the vertical rows of which an elevating table 15 with, for example, two gripper supports 14 can be moved. The column structure 13 can be conveyed on rails 17 by a drive 16, and the elevating table 15 can be moved vertically by means of an elevating drive 18 on the columns 13, the table being, for example, suspended from cables 19. Each gripper support 14 is roughly U-shaped and has a roller track 21 on each side on the rollers of which a bin or material container 23 can be conveyed for the material 24 to be put into or taken out of stock, such as long rods for example. The length of the gripper support 14 is at least equal to the length of the bin 23.

On the inside of the two vertical side pieces 20 of the U-shaped gripper support 14, circulating chains 26, 27 are arranged along a horizontal oval, each chain being driven by a motor 31 and guided by means of guide sprocket wheels 28, 29. Clearly, cables, belts or similar endless circulating flexible elements can be used instead of the chains. The oval formed by the chains 26, 27 is only slightly shorter than the gripper support 14. Attached to the gripper support 14 above and below each of the chains 26, 27 are in each case a horizontal, parallel trough-shaped guide rail 32, 33 and an upper guide strip 34 on which the gripper device 36 is movably guided in a longitudinal direction in sledge or carriage manner. To each chain 26, 27 a gripper device is allocated which can be moved to and fro by the respective chain 26, 27 in the direction of the roller track 21, i.e., in the longitudinal direction of the carrier support 14. Each of the gripper devices 36 is provided with two gripper arms 37, 38 and serves to pick up a bin 23 located in a compartment in the set of storage shelves 12 and to pull it from the respective compartment onto the support 14. Thereafter, and/or after the column structure 13 has been moved, the bin 23 can then, if need be, either be reinserted into another compartment in the set of storage shelves 12 from the support 14, or it can be moved down from the support 14 to a location outside of the store for removal by means of a truck or other vehicle. Thus, each of the gripper devices 36 can pick up a bin 23, for example on a traverse 39 or the like, and insert it into a compartment of the set of storage shelves 12, position accurately in this compartment, disengage from the bin 23 or alternatively release it, and withdraw from the handling range of bin 23 or of traverse 39. The gripper devices 36 are identical but operate in opposite directions, i.e., one serves the part located on one side of the device 11 and the other serves the part of the set of storage shelves 12 located on the other side.

Figure 3:
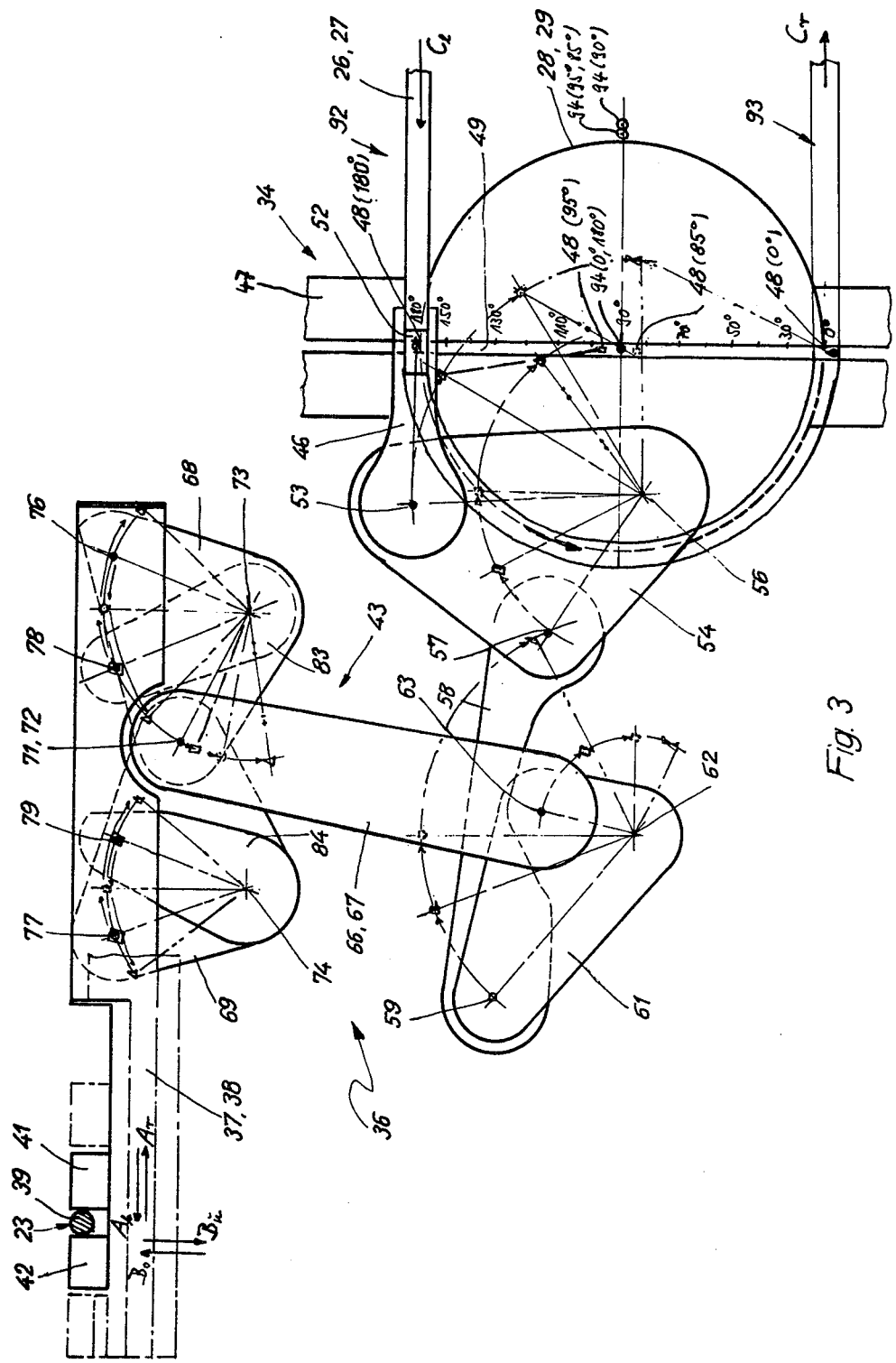
FIG. 3 shows a schematic representation of one of the two gripper devices in different operating positions in accordance with one embodiment.
Figure 4:
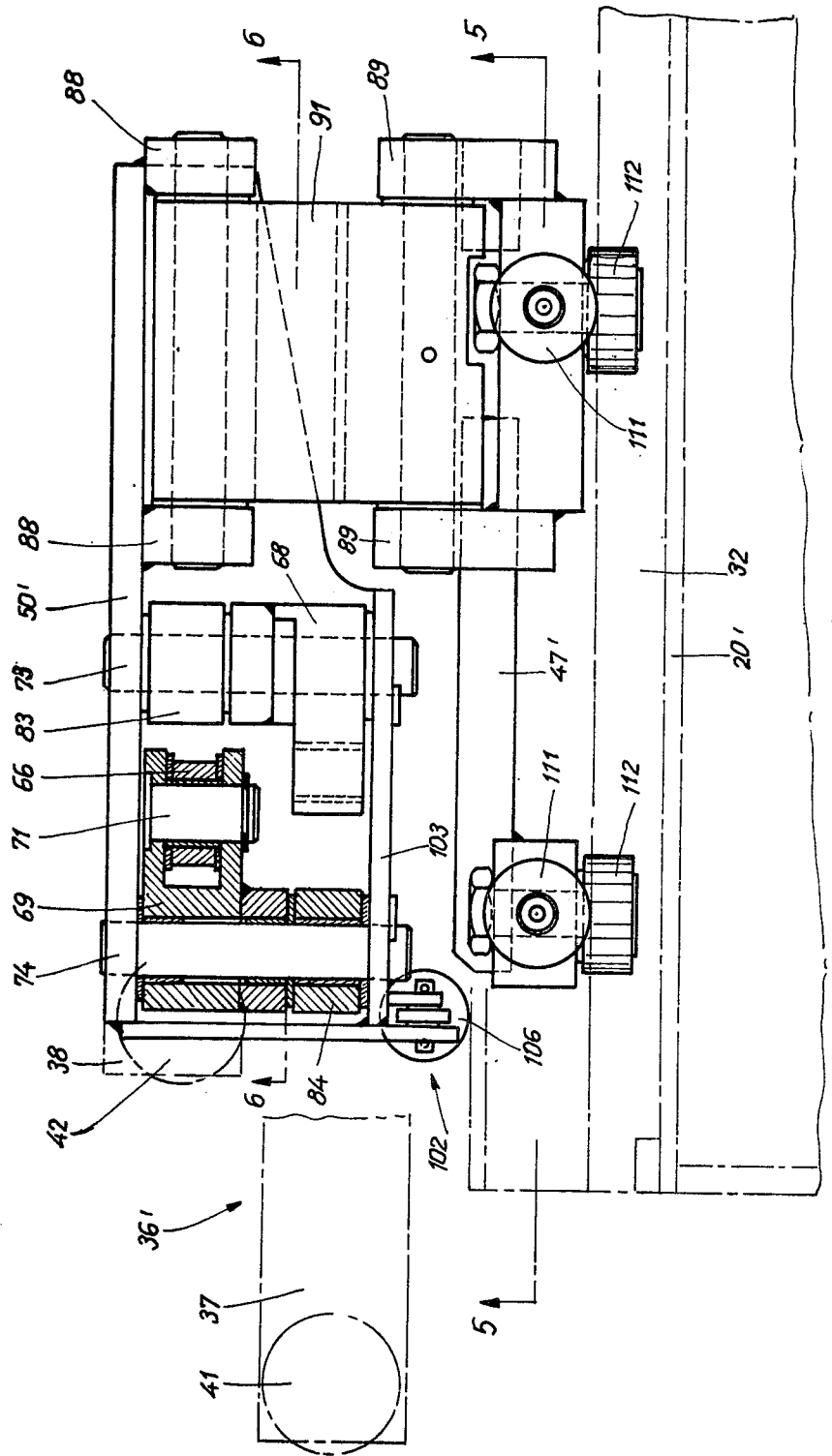
FIG. 4 shows a plan view, partly as a section, of one of the two gripper devices, the gripper arms merely being indicated by dot-dash lines, in accordance with another preferred embodiment of the present invention.

In FIG. 3, one of the two gripper devices 36 is shown schematically in accordance with a first embodiment. Their gripper arms 37, 38 which are arranged parallel to each other and at the ends of which clamping parts 41, 42 pointing upwards are provided, operate in opposite directions horizontally in the direction of the double arrow A, i.e., they can be moved either towards each other or away from each other. This horizontal movement A is superimposed by a vertical relative movement in accordance with double arrow B. Thus, the gripper arms 37, 38 move first of all upwards to pick up a bin 23 and then towards each other, and to release a bin 23 they first move away from each other and then downwards to a point beneath the traverse 39 of bin 23. The movements of the gripper arms 37, 38 are derived from the circulating movement of the chain 26, 27 in one of the directions in accordance with double arrow C in which a lever linkage 43 arranged on the gripper device and movable with this is interposed. The lever linkage 43 has, for this purpose, a control lever 46 at the free end of which there is a pin 48 which can be rotated but not moved from its location. The pin 48 is guided on a crank 49 which is attached to a guide plate 47 of gripper device 36, the crank being designed as a slot and perpendicular to the longitudinal plane of the support 14. The pin 48 or another part rigidly connected with it is firmly connected to one link 52 of the chain 26, 27. This connection thus also serves at the same time for driving the guide plate 47. The control lever 46 is flexibly connected to a first elbow lever 54 through an axle 53, the swivel axle 56 of the elbow lever being opposite to axle 53 and located in a fixed position on the guide plate 47. Linked to the third axle 57 of the first elbow lever 54 is a pressure lever 58, the other end of which is flexibly connected to a second elbow lever 61 through an axle 59, the axle 59 being on the other side of the first elbow lever 54 in the initial position shown in FIG. 3 with reference to a swivel axle 62 located in a fixed position on a gripper plate 50 which is parallel to the guide plate 47 and rigidly connected to this. On a third axle of the second elbow lever 61, which is considerably less distant from the swivel axle 62 than from the axle 59, two parallel dead levers 66, 67 having only slightly differing movements are pivoted, these levers being arranged on both sides of the second elbow lever 62 and pressure lever 58 and directed towards the ends of the two gripper arms 37, 38. Each of the dead levers 66, 67 is flexibly connected to a third and fourth elbow lever 68, 69 respectively through an axle 71, 72. The third and fourth elbow levers 68, 69 are located in a fixed position on the plate 50 by means of a swivel axle 73, 74 respectively allowing them to swivel, whereas the third axle 76 of the third elbow lever 68 engages at the rear end of the gripper arm 37 and the third axle 77 of the elbow lever 69 engages roughly in the center of the gripper arm 38 such that it can swivel. Furthermore, a swivel arm 83 and 84 engages roughly in the middle of the gripper arm 37 and at the rear end of the gripper arm 38 on an axle 78 and 79 respectively, the swivel arm being located on the axle 73 and 74 respectively such that it can swivel. The gripper arms 37, 38 are parallel and are essentially horizontal since the elbow levers 68, 69 and the swivel arms 83, 84 each have the same respective dimensions and the swivel arms 83, 84 are just as long as the corresponding elbow lever arm which is parallel to them. All elbow levers 54, 61, 68, 69 may be plates of roughly triangular shape and in general they have different arm lengths. Whereas the swivel axles 56, 62, 73, 74 are rigidly located with respect to the guide plate 47 or gripper plate 50, the other axles 57, 59, 63, 71–74 and 76–79 are movable on a circular track around the swivel axle concerned.

In the position drawn in FIG. 3 in solid lines, the complete gripper device 36 is drawn in a straight line in a horizontal direction of movement from the chain 26, 27 along the support 14. During this horizontal movement, the pin 48 remains in the region marked with 180° of bin 49 and does not move relative to the guide plate 47 because the chain link 52 connected to pin 48 travels in the upper area 92 of the chain track. In this position, the movable axles 57, 59, 63–71–74, 76–79 are in their positions marked with a circle. The two gripper arms 37, 38 have moved towards each other, are at their minimum distance from each other, and clamp between them the traverse 39 of a bin 23. If the chain link 52 with pin 48 now enters a range of rotary motion, i.e., in the range of the sprocket wheel 28 or 29, the bin 23 is then almost completely inserted into a compartment of the set of storage shelves 12. During the rotary motion of the chain link 52, the pin 48 is given a vertical movement in addition to the horizontal movement on account of the crank 49. Roughly up to the 95° mark, this movement of the chain link 52 from the upper track region 92 to the lower track region 93 does not result in a movement of the gripper arms 37, 38 relative to each other. On the other hand, during this movement through 85° the bin 23 is inserted further up to its precise position in the compartment. Although the axles 53, 57, 59, 63 and to a minimal extent also the axles 71, 72, have swivelled into a position marked by a square, the two gripper arms 37, 38 have not shifted because of the addition of the two dead regions in the swivel characteristic of the elbow levers 54, 68, 69. In this position, the relative position of the gripper device 36 has also shifted with respect to the axis of rotation 94 of the sprocket wheel 28, 29; in FIG. 3, however, the sprocket wheel which is actually attached in a fixed position on the support 14 has been drawn in a transposed position instead of the gripper device for the sake of simplicity.

The gripper arms 37, 38 open almost instantaneously within an angular range of about 10° which is passed through by chain link 52 only when it moves past the 95° mark. This opening movement, the end of which is represented with respect to the individual axes by means of chain-lined circles, is sufficiently large within the 10° passed through by pin 84 to release the bin 23 or its traverse 39. It can be seen from the position of the axis of rotation 94 of the sprocket wheel 28, 29 that the gripper device 36 has hardly moved during this angular movement, and thus that the bin 23 has hardly moved in a horizontal direction, and hence it is possible to position the bins very accurately. The gripper arms 37, 38 are still essentially in the same vertical plane. During the continued angular movement of the chain link 52 when the gripper arms 37, 38 open even more, although this no longer has any effect on the actual releasing of the bin 23, the gripper arms 37, 38 move vertically downwards in accordance with arrow B to the point where their clamping parts 41, 42 become disengaged from the traverse 39 of bin 23 and can be moved back in the direction $C_r$, this movement taking place at about the same time. The chain link 52 with pin 48 moves back in the lower region 93 of the chain track and thus the gripper device 36 removes bin 23 which is stored in a compartment of the set of storage shelves 12. This position is identified with respect to the movable axles of the levers with a triangle.

If another bin 23 is to be picked up, the movement of the gripper device 36 and the gripper arms 37, 38 takes place in the reverse sequence at the level of the shelf compartment in question. The chain 26, 27 is reversed such that the gripper device 36 moves in the direction opposite to that shown by arrows C. At the same time, at the starting point of this operation, the chain link 52 connected to pin 48 is in the lower region 93 of the horizontally circulating chain 26, 27 and in 48 is at the 0° mark of crank 49. The gripper arms 37, 38 are opened very wide and are lowered opposite to traverse 39 of bin 23. During the upward rotary movement of chain link 52, the gripper arms 37, 38 move upwards in the direction of arrow B in the plane of the traverse 39 of bin 23 and at the same time they move slightly together, and yet the opening of gripper arms 37, 38 is still of such magnitude that bin 23 can not yet be securely held. An instantaneous closing movement occurs only in the angular range between 85° and 95°, starting from the lower region 93 in which the gripper arms 37, 38 are located in the plane of traverse 39 of bin 23, and thus traverse 39 is clamped between the clamping part 41, 42 of the gripper arms. The continued rotary motion of the chain link 52 towards the upper region 92 does not result in a relative movement of the gripper arms 37, 38 because of the dead region of the elbow lever and dead lever in question. The bin 23 concerned is now withdrawn completely from the compartment in the set of storage shelves 12.

In the preferred embodiment of the present invention shown in FIGS. 4 to 7, each of the two identical gripper devices 36′ of a gripper support 14′ is made in two parts inasmuch as the gripper plate 50′ is coupled to the guide plate 47′, which is immovable relative to the chain 26, 27, the gripper arms, the axles 62, 73, 74 in relatively fixed locations, and the levers 58, 61, 66, 67, 68, 69 and 83, 84 of the lever linkage 43 being coupled or supported on said gripper plate 50′. The levers 46 and 54′ and the axle 56 in a relatively fixed location are coupled or supported on the guide plate 47′. In this embodiment, the first elbow lever 54′ has an arm 85 with a projecting part 87 located centrally and perpendicular to it and which can be connected to the pressure lever 58 by inserting it over axle 57′. The guide plate 47′ and the gripper plate 50′ have in an upper region facing the ends of the gripper arms 37, 38 bearing lugs 88, 89 arranged parallel to each other and between which a control lever 91 is held such that it can be pivoted by means of horizontal pivot pins or suchlike parallel to the gripper arms. The gripper plate 50′ is thus vertically adjustable with respect to the guide plate 47′ in a direction perpendicular to the plane of the chain 26, 27. This means that the lift which is necessary in order to bring the gripper arms or their clamping parts 41, 42 in and out of the handling range of bin 23 or its traverse 39 need not be provided solely, or indeed not at all, by an additional swivelling movement of the gripper arms. Furthermore, the lifting movement can be relatively large.

The lifting movement of the gripper plate 50′ relative to the guide plate 47′ is controlled by means of a two-arm control lever 96 which is pivotably located on an axle 97 of guide plate 47′ and one of its ends rolls over a cam plate 99 by means of a roller bearing 98. The cam plate 99 is unrotatably attached to the first elbow lever 54′ at its fixed axle 56 facing away from the single-arm control lever 46. The control cam has a roughly circular shape in a region 100 changing into a region 101 which goes back from it roughly at right angles. The end of the two-arm control lever 96 facing away from the cam plate 99 is coupled at the lower end of a plunger arrangement 102 which is arranged roughly vertically and the upper end of which engages flexibly on the gripper plate 50′ and a bearing plate 103 which is parallel and connected to this. The plunger arrangement 102 has a tube 104 whose upper end is closed by a cover plate 109 that is flexibly connected to the gripper plate 50′ or the bearing plate 103 and whose lower end is closed by a sleeve 105, supporting a steering lever 118 which is also flexibly connected to the gripper plate 50′, and in the internal thread of which a screw bolt 106 can be screwed in. A check ring 107 is supported on the head of the screw bolt 106, and furthermore it is movably located along the screw bolt 106 and flexibly connected to the two-arm control lever 96. Around the tube 104 and between the cover plate 109 and the check ring 107, there is a compression spring 108 which pushes the check ring 107 downwards and consequently the control lever 96 against the cam plate 99.

Figure 5:
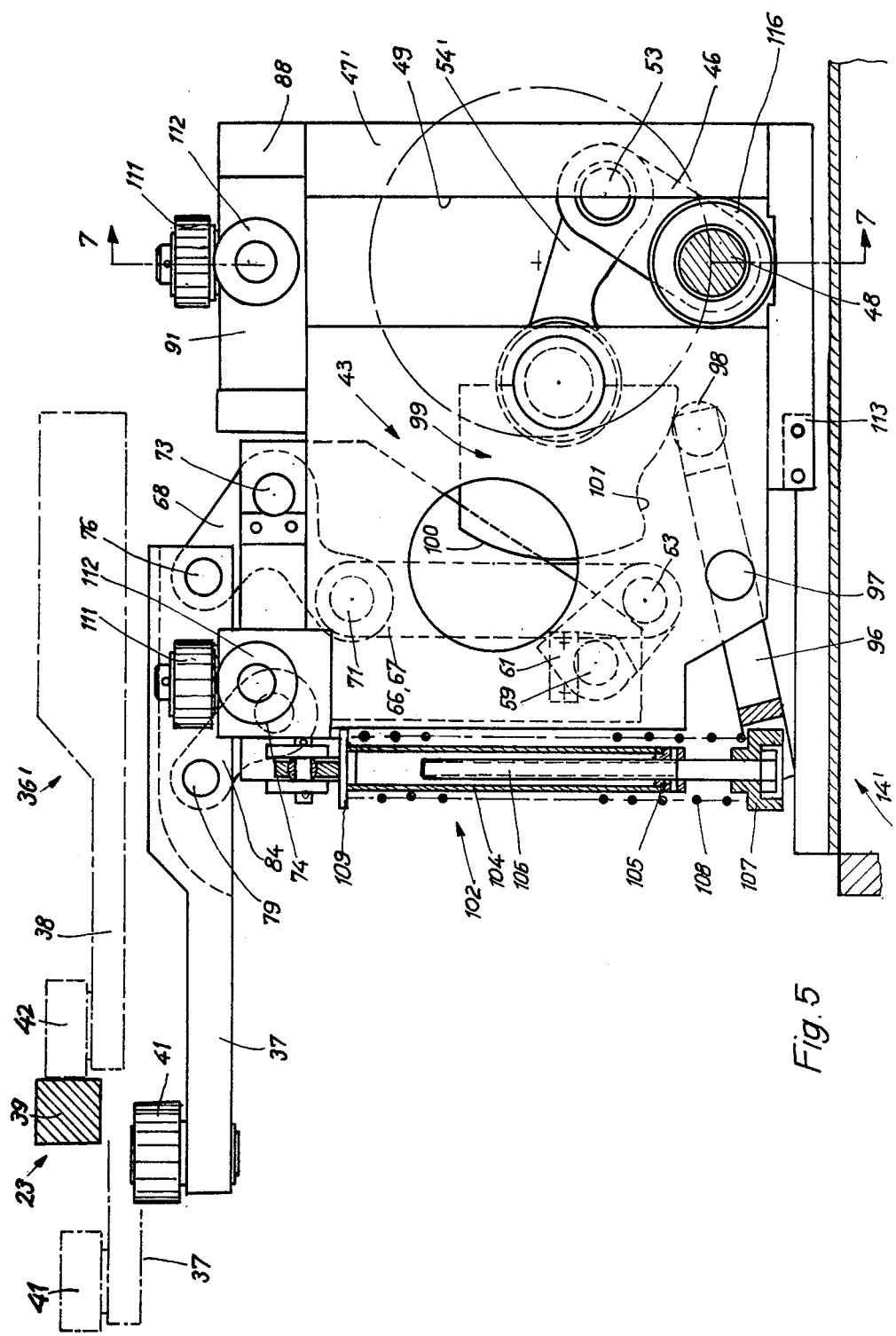
FIG. 5 shows a longitudinal section along line 5—5 in FIG. 4.
Figure 6:
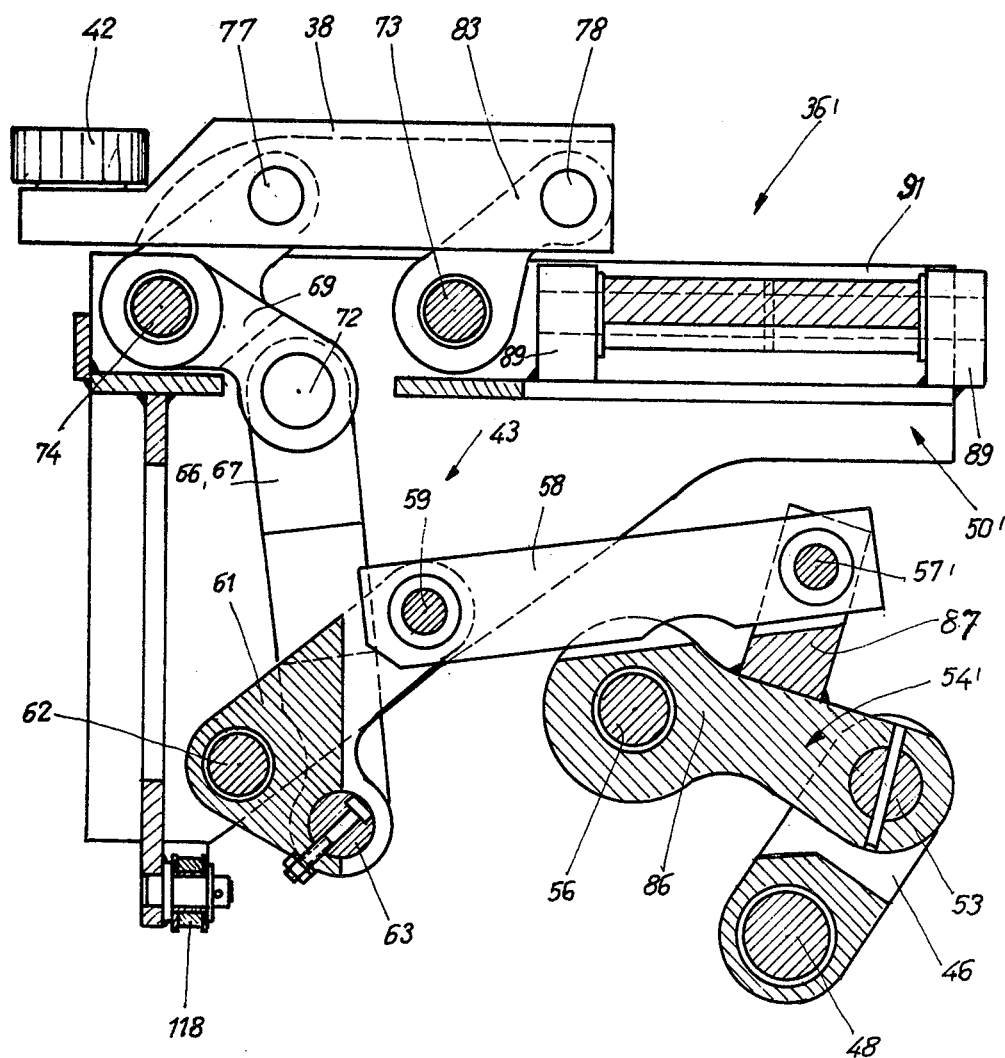
FIG. 6 shows a longitudinal section along line 6—6 in FIG. 4.
Figure 7:
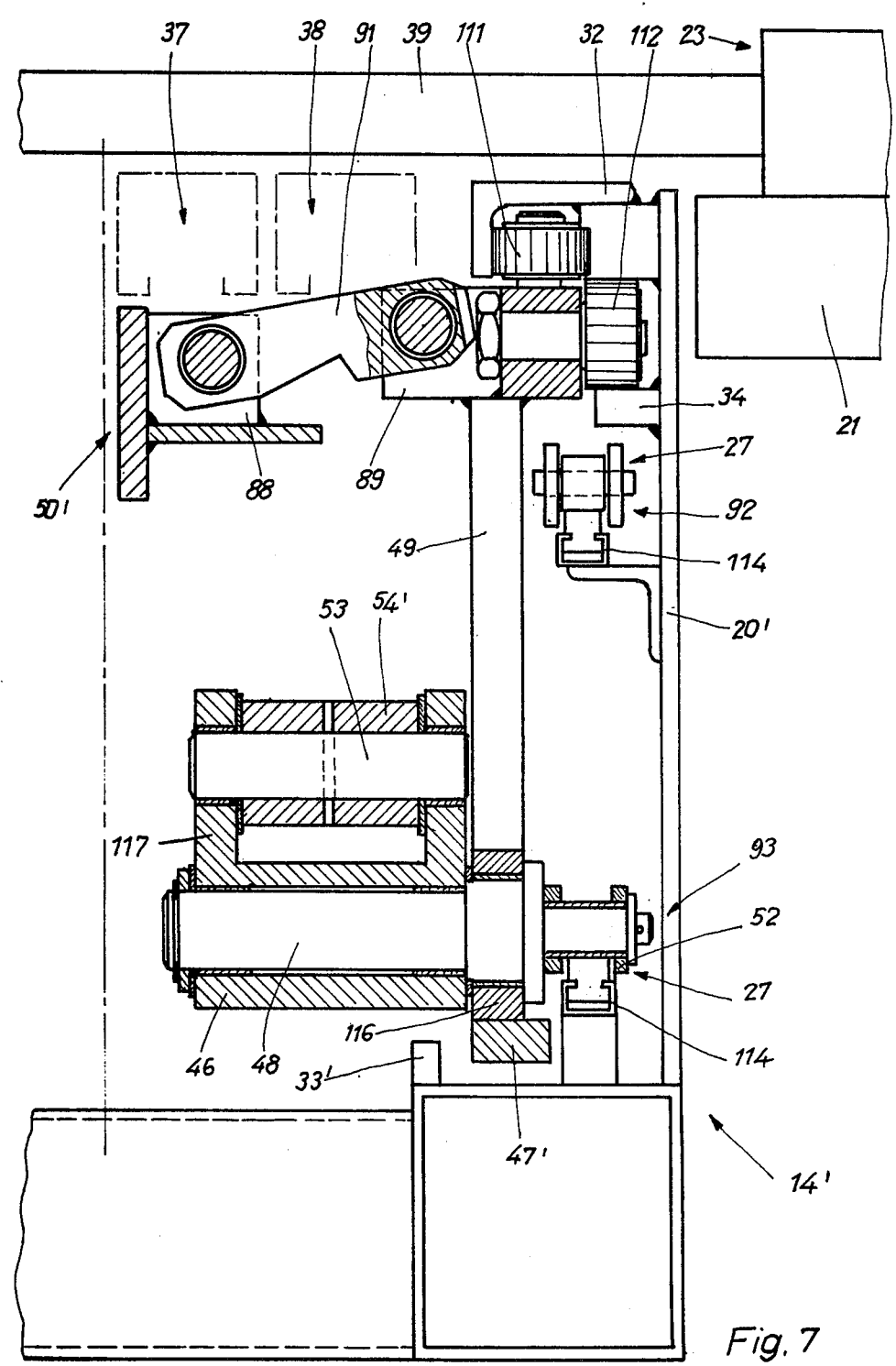
FIG. 7 shows a cross section along line 7—7 in FIG. 5.

In FIG. 5, that position is shown in which the gripper plate 50′ is in its lower position and hence the gripper arms 37, 38 are in a position beneath the traverse 39 of bin 23. The elevated position is indicated in FIG. 5 by a dot-dash line in which the clamping parts 41, 42 of the gripper arms 37, 38 are located at the level of the traverse 39 of a bin 23. In this latter position, the control lever 96 rolls over the region 100 of cam plate 99 such that the plunger arrangement 102 is pushed upwards and the control lever 91 is swivelled upwards from the position shown in FIG. 7 in accordance with arrow L. The cam plate 99 is located relative to the position of the individual levers of the lever linkage 43 in such a way that a lifting movement of the gripper arms 37, 38 takes place essentially before its closing movement and a lowering movement of the gripper arms 37, 38 takes place essentially before their opening movement. It is sufficient here if the opening movement of the gripper arms has been effected to the extent that they have released the traverse 39 of a bin 23. The lifting and lowering movement can then superimpose a further opening or closing movement respectively of the gripper arms. Similarly, the complete clamping closing movement takes place only after the complete lifting movement has been performed.

Figure 2:
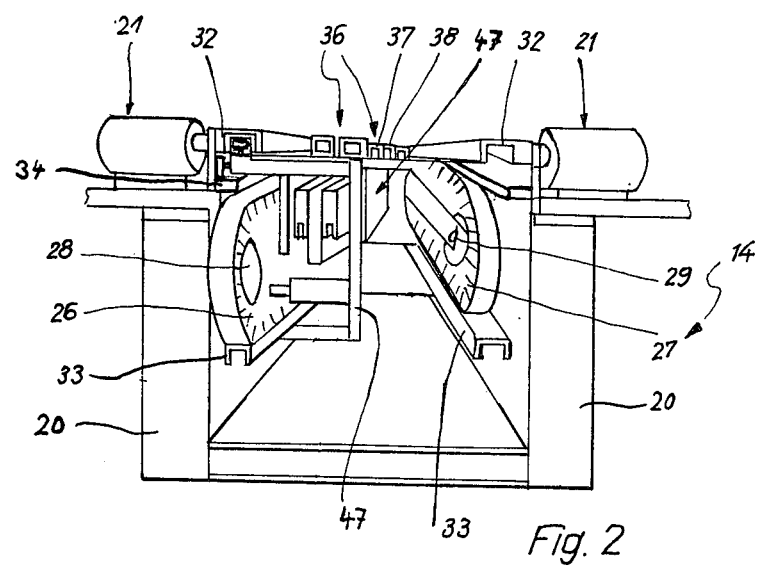
FIG. 2 shows a schematic perspective view from one end of a gripper support used in the long-material stacker according to the invention with the gripper arrangements.

The individual levers, arms, and axles of this embodiment correspond essentially to those of the embodiment illustrated in FIG. 3. It can be seen from FIG. 7 that when viewed in cross section the gripper arms 37, 38 have the shape of an inverted U in which the coupled levers 68, 69 and 83, 84 engage, and this is also indicated in FIG. 2. An embodiment for supporting the guide plates 47′ to a vertical side piece 20′ of the U-shaped gripper support 14′, to which the sprocket wheels 28, 29 are also rotatably mounted, can also be seen from the same figure. Above the upper track region 92 of chain 26, 27, in which range the upper trough-shaped guide rail 32 and the upper guide strip 34 are located, the guide plate 47′ possesses at the front a roller bearing 111 equipped with a perpendicular axle and another such roller bearing with axle at the rear, said bearings rolling over the internal surfaces of the upper trough-shaped guide rail 32, and also one roller bearing 112 with horizontal axle at the front and another at the rear which roll on the upper guide strip 34. At its lower end opposite to the roller bearings 111, 112, the guide plate 47' is supported from the outside on a lower guide strip 33' by means of a roller bearing 113 indicated in FIG. 5. It can also be seen from FIG. 7, in which only one half of the symmetrical gripper support 14' is shown in cross section, that the chain 26, 27 is guided in its upper and lower horizontal track regions 92, 93 by means of a trough-shaped mounting 114. Furthermore, in accordance with FIG. 7, the pin 48 guided in the slot-shaped crank 49 of guide plate 47' by means of roller bearing 116 is attached to the chain 26, 27 between two chain links 52 and also rotatably mounted in a single-arm control lever by means of a roller bearing. One end of the first elbow lever 54', to which both levers are pivotably attached by the axle 53, engages between two bearing lugs 107 of control lever 46. The levers on the gripper plate 50' can also be flexibly connected together in a similarly compact and mutually engaging manner as shown, for example, in FIG. 4 with levers 68, 69, 83, 84 and 66, 67. Both the horizontal movement of the entire gripper arrangement and also the movement of the gripper arms relative to each other and relative in a vertical sense to the gripper arrangement or chain are taken up from a single point by the circulating chain and transmitted through a lever linkage, the lever linkage transmitting the force to be taken up by the gripper arms during the horizontal movement only to a small degree to the pin located in the slot guide during its movement within the crank which is designed as a slot guide. At the same time, the pressure lever arranged between the control lever and the dead levers is subjected in an ideal manner only to compressive loads, both during the insertion movement and also during the withdrawal movement because the transfer of movement from one gripper arm to the pressure lever is in the opposite direction to that of the other. Clearly the transmission of the movements can also be effected by means of other similar lever arrangements, where it must however be ensured that instantaneous opening in a small angular range must take place during the rotary motion of the chain as a result of dead positions or regions from one or several levers. This instantaneous opening could also take place in another range of rotary motion than in that in which the horizontal velocity of the chain is zero, even though this embodiment is preferred. In the described embodiment, it is ensured furthermore that only those forces and velocities occur on arms, levers and suchlike that do not have a disturbing effect on the function of the device. In addition, it is ensured that essentially only horizontal and no vertical or inclined forces are applied to the gripping arms during withdrawal or insertion of a bin, and thus the gripper arms cannot slip away from the bin.

Even though the gripper support 14 according to the present invention has been shown in connection with a long-material stacker as a movable unit, it is clear that the gripper support with one or both gripper arrangement(s) can also be designed in accordance with another embodiment that is not illustrated but is permanently located, for example, on a set of shelves or a loading ramp. At the same time, the length of the gripper support is of no significance. For example, a permanently located gripper support can replace a permanently installed roller track of the type commonly used.

Various modifications can be made without departing from the invention.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a device for inserting and/or withdrawing particularly long and/or heavy material in and/or from a storage container having several horizontal and vertical shelves, the improvement wherein said device includes an elevating table; a column means, said elevating table being vertically movably attached to said column means; at least one gripper support means mounted on said elevating table; an endless chain mounted for circulating movement on said gripper support means, said endless chain having two parallel and horizontal runs; a gripper means mounted on said endless chain for horizontal movement to-and-fro along the gripper support means, said gripper means including at least two gripper arms whose relative movement for picking up and releasing the material in said storage container is derived solely from the movement of said endless chain, said gripper means also including a link means connecting said gripper arms to said endless chain, said link means causing said gripper arms to move together when said endless chain causes said gripper means to move along a horizontal run thereof and then move apart and finally downwardly relative to said gripper means and thus away from said material when the horizontal movement of said gripper means is temporarily stopped and when the mounting point between said gripper means and said endless chain circulates from one of the horizontal runs of said endless chain to the other.

2. A device according to claim 1, wherein said means for producing opening and closing movements of said gripper arms causes said movements to occur practically instantaneously within a small angular range of circulation of said endless chain.

3. A device according to claim 1, wherein the chain is wrapped in part around a rotating sprocket wheel, and wherein the opening and closing movements of the gripper arms are effected within an angular range of rotary motion of $+/-10°$ of said sprocket wheel.

4. A device according to claim 3, wherein said means for producing opening and closing movements of said gripper arms also functions to move the gripper arms away from the handling range of the material in an essentially vertical fashion before or after the produced opening and closing movement, respectively, of the gripper arms.

5. A device according to claim 4, wherein said means for moving the gripper arms functions to cause simultaneous vertical and opening and closing movements.

6. A device according to claim 5, wherein said means for moving the gripper arms includes a steering lever linkage connected to said circulating chain.

7. A device according to claim 6, wherein said steering lever linkage includes steering levers connected to the gripper arms.

8. A device according to claim 7, wherein said steering lever linkage includes a single-arm control lever which is firmly connected to said circulating chain by a pin means.

9. A device according to claim 8, wherein the pin means of the single-arm control lever is guided in an essentially vertical slotted guide arranged on the horizontally movable gripper means.

10. A device according to claim 9, in which the slotted guide is straight-lined.

11. A device according to claim 9, in which the gripper means is designed in two parts and includes a guide plate equipped with the slotted guide and being located in a fixed position relative to said chain, and a gripper plate equipped with the gripper arms being located movably and essentially in a perpendicular direction with respect to the plane of the circulating chain.

12. A device according to claim 11, in which the gripper plate is movably fixed to the guide plate.

13. A device according to claim 12, in which the gripper plate and the guide plate have shafts that are parallel to each other and connected by a control lever such that they can swivel.

14. A device according to claim 13, in which the gripper plate bears against one end of a two-arm control lever pivotably located on the guide plate, the other end being located against a cam plate which is connected to the single-arm control lever attached to the circulating chain.

15. A device according to claim 14, including means to adjust the magnitude of the shifting movement of the gripper plate relative to the guide plate.

16. A device according to claim 15, in which the control lever is rotatably mounted on said pin.

17. A device according to claim 16, in which a permanently located swivel axle of a first elbow lever that is flexibly connected to said single-arm control lever is arranged on the guide plate of the gripper means.

18. A device according to claim 17, in which the first elbow lever is separably and flexibly connected to a pressure lever mounted on the gripper plate.

19. A device according to claim 18, in which the two gripper arms are connected wth the single-arm control lever through at least one two-arm elbow lever in such a way that they execute practically no opening or closing movement in a specific angular range of rotary motion and wherein a cam plate is designed in such a way that the lifting movement of the gripper arms takes place in that part of the range of rotary motion that follows the first opening movement or is before the completed closing movement.

20. A device according to claim 19, in which the cam plate that effects the relative movement of the gripper plate is connected to the first elbow lever in such a way that it cannot rotate.

21. A device according to claim 19, in which the second elbow lever is coupled between the pressure lever and a dead lever in such a way that a relatively large dead center region results.

22. A device according to claim 21, in which the angular dead region referred to the angular range of rotary motion of the chain corresponds to an angular movement of about 80° to 90°.

23. A device according to claim 22, in which the two gripper arms which move in opposite directions are flexibly connected through one elbow lever each to two essentially parallel dead levers that move in the same direction, said gripper arms being supported by two appropriately mounted swivel arms.

24. A device according to claim 1, in which said elevating table has two gripper supports.

25. A device according to claim 24, in which each gripper support has two gripper means, the gripper arms of which are operable in opposing directions.

26. A device according to claim 25, in which each gripper support is designed as a permanently located separate conveying unit.

* * * * *